(12) United States Patent
Oishi

(10) Patent No.: US 9,221,352 B2
(45) Date of Patent: Dec. 29, 2015

(54) CHARGING CONTROL APPARATUS AND METHOD, CHARGING SYSTEM, CORRELATION METHOD, AND COMPUTER PROGRAM

(71) Applicant: PIONEER CORPORATION, Kanagawa (JP)

(72) Inventor: Hirokazu Oishi, Kanagawa (JP)

(73) Assignee: PIONEER CORPORATION, Kanagawa (JP)

( * ) Notice: Subject to any disclaimer, the term of this patent is extended or adjusted under 35 U.S.C. 154(b) by 0 days.

(21) Appl. No.: 14/472,412

(22) Filed: Aug. 29, 2014

(65) Prior Publication Data

US 2014/0368166 A1 Dec. 18, 2014

Related U.S. Application Data

(62) Division of application No. 13/985,099, filed as application No. PCT/JP2011/053378 on Feb. 17, 2011.

(51) Int. Cl.
| | |
|---|---|
| H02J 7/00 | (2006.01) |
| B60L 11/18 | (2006.01) |
| H02J 5/00 | (2006.01) |
| H02J 7/02 | (2006.01) |
| B60L 3/00 | (2006.01) |
| B60L 3/04 | (2006.01) |
| H02J 17/00 | (2006.01) |

(52) U.S. Cl.
CPC .......... *B60L 11/1838* (2013.01); *B60L 3/0046* (2013.01); *B60L 3/04* (2013.01); *B60L 11/182* (2013.01); *B60L 11/1831* (2013.01);
(Continued)

(58) Field of Classification Search
CPC ............ B60L 11/1838; B60L 11/1824; B60L 11/182; B60L 11/1846

USPC .............. 320/106, 108, 109; 180/65.1, 65.21, 180/65.29; 701/22
See application file for complete search history.

(56) References Cited

U.S. PATENT DOCUMENTS 5,850,135 A * 12/1998 Kuki ................... B60L 11/1805
320/108
8,143,745 B2    3/2012 Shiozaki et al.
(Continued)

FOREIGN PATENT DOCUMENTS

| JP | 2006-074868 | 3/2006 |
|---|---|---|
| JP | 2008-253131 | 10/2008 |

(Continued)

OTHER PUBLICATIONS

International Search Report PCT/JP2011/053378, May 24, 2011.

*Primary Examiner* — Richard V Muralidar
(74) *Attorney, Agent, or Firm* — Young & Thompson

(57) ABSTRACT

A charging control apparatus (310) controls wireless charging between one charging apparatus (10) and a vehicle (20) which communicates with the one charging apparatus via a communication relay apparatus (30). The charging control apparatus is provided with: an outputting device (320, 330) for transmitting a first signal which is a signal for designating a signal outputted from the one charging apparatuses, to of the one charging apparatuses; a detecting device (320, 330) for detecting a third signal which is transmitted by wireless communication from the vehicle and which is a signal corresponding to a second signal which is a signal outputted from the one charging apparatus due to the transmitted first signal; and a distinguishing device (310) for correlating the one charging apparatus with the vehicle on the basis of the transmitted first signal and the detected third signal.

9 Claims, 5 Drawing Sheets

(52) U.S. Cl.
CPC ......... *B60L11/1837* (2013.01); *B60L 11/1846*
(2013.01); *H02J 5/005* (2013.01); *H02J 7/0004*
(2013.01); *H02J 7/007* (2013.01); *H02J 7/0027*
(2013.01); *H02J 7/0052* (2013.01); *H02J 7/025*
(2013.01); *B60L 2210/10* (2013.01); *B60L 2210/30* (2013.01); *B60L 2210/40* (2013.01); *B60L 2240/70* (2013.01); *B60L 2240/80* (2013.01); *B60L 2250/10* (2013.01); *B60L 2250/16* (2013.01); *H02J 17/00* (2013.01); *Y02T 10/7005* (2013.01); *Y02T 10/7216* (2013.01); *Y02T 10/7241* (2013.01); *Y02T 10/7291* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| | | | |
|---|---|---|---|
| 8,339,097 B2 * | 12/2012 | Kojima | H02J 7/025 320/106 |
| 8,525,473 B2 * | 9/2013 | Shimizu | B60L 11/1816 320/109 |
| 8,725,330 B2 * | 5/2014 | Failing | B60L 3/00 701/22 |
| 8,841,881 B2 * | 9/2014 | Failing | B60L 3/00 307/65 |
| 2010/0013320 A1 | 1/2010 | Shiozaki et al. | |
| 2010/0161216 A1 | 6/2010 | Yamamoto | |
| 2011/0187321 A1 | 8/2011 | Hirayama | |
| 2013/0038272 A1 | 2/2013 | Sagata | |
| 2014/0035522 A1 * | 2/2014 | Oishi | B60L 11/182 320/108 |
| 2014/0375266 A1 * | 12/2014 | Oishi | B60L 11/182 320/109 |
| 2014/0375267 A1 * | 12/2014 | Oishi | B60L 11/182 320/109 |

FOREIGN PATENT DOCUMENTS

| | | |
|---|---|---|
| JP | 2010-028937 | 2/2010 |
| JP | 2010-068632 | 3/2010 |
| JP | 2010-104097 | 5/2010 |
| JP | 2010-161912 | 7/2010 |
| JP | 2010-172184 | 8/2010 |
| JP | 2010-178450 | 8/2010 |
| WO | 2012086048 | 6/2012 |

* cited by examiner

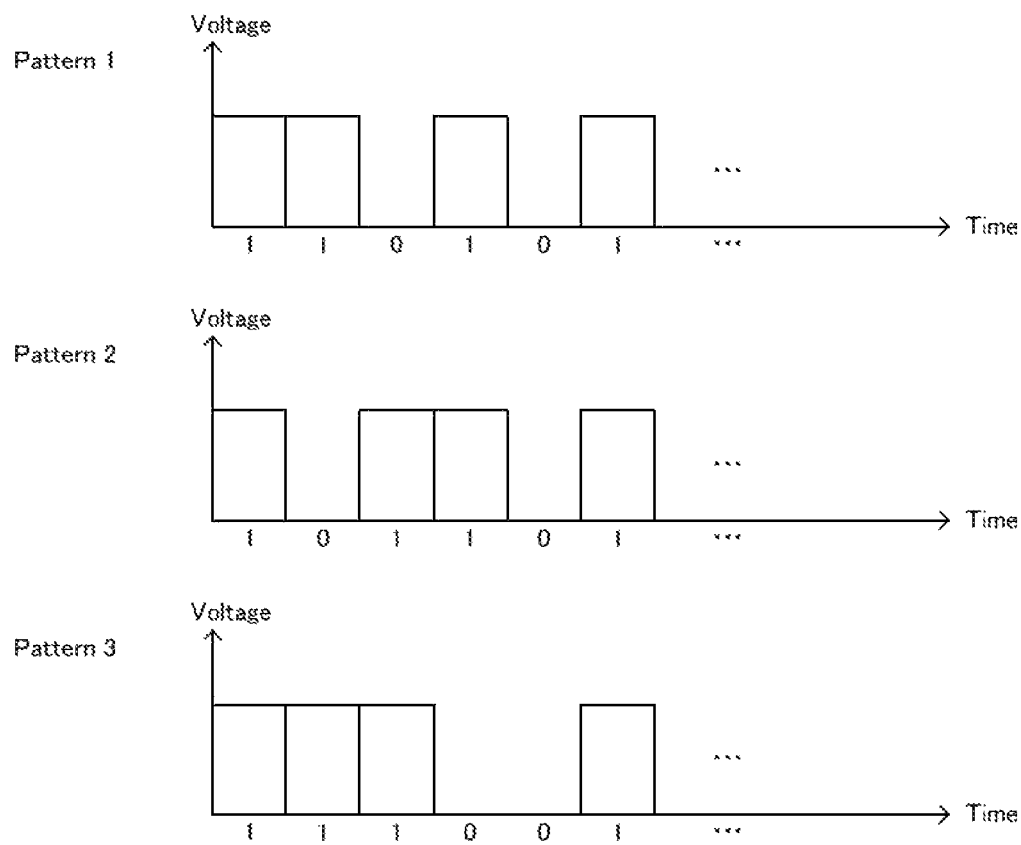

CHARGING CONTROL APPARATUS AND METHOD, CHARGING SYSTEM, CORRELATION METHOD, AND COMPUTER PROGRAM

CROSS REFERENCE TO RELATED APPLICATIONS

This application is a divisional application of application Ser. No. 13/985,099, filed Aug. 13, 2013, and is the National Stage of PCT/JP2011/053378, filed on Feb. 17, 2011. This application is related to application Ser. Nos. 14/477,894 and 14/477,897, both of which were filed on Sep. 5, 2014, and are divisional applications of application Ser. No. 13/985,099, filed Aug. 13, 2013, and is the National Stage of PCT/JP2011/053378, filed on Feb. 17, 2011.

TECHNICAL FIELD

The present invention relates to a charging control apparatus and method, a charging system, a correlation method, and a computer program, which are configured to control wireless charging performed between a vehicle which is provided with a secondary battery, and a charging apparatus which is configured to charge the secondary battery.

BACKGROUND ART

As a charging system provided with this type of apparatus, for example, there is suggested a system which is provided with a charging station for charging a battery of a vehicle parked in a preset charging space in a wireless manner, and a service system server for collectively managing vehicle information of individual users registered in advance. Here in particular, it is described that the charging station, the service system, server, and the system of the vehicle are connected to one another via a wireless communication network (refer to Patent document 1).

Incidentally, there is also suggested a system which is provided with a charging stand having a plurality of chargers for supplying electric power to the vehicle via charging cables (refer to Patent document 2).

PRIOR ART DOCUMENT

Patent Document

Patent document 1: Japanese Patent Application Laid Open No. 2006-74868
Patent document 2: Japanese Patent Application Laid Open No. 2010-178450

DISCLOSURE OF INVENTION

Subject to be Solved by the Invention

The Patent document 1 does not disclose a method of checking whether or not the vehicle is parked in the charging parking space of the charging station. If there are provided a plurality of charging apparatuses (corresponding to the charging stations in the Patent document 1), there is a possibility that the charging apparatuses are not appropriately correlated with the vehicle because the charging apparatuses and the vehicle are not directly connected, for example, via the charging cables or the like, which is technically problematic.

In view of the aforementioned problems, it is therefore an object of the present invention to provide a charging control apparatus and method, a charging system, a correlation method, and a computer program, which are configured to appropriately correlate a charging apparatus, which is configured to charge a secondary battery installed in a vehicle in a wireless manner, with the vehicle.

Means for Solving the Subject

The first charging control apparatus of the present invention is, in order to solve the above-mentioned subject, a charging control apparatus for controlling wireless charging between (i) one of a plurality of charging apparatuses which are configured to perform wireless charging en a battery installed in a vehicle and (ii) the vehicle which communicates with the one charging apparatus via a communication relay apparatus which is configured to relay communication between the plurality of charging apparatuses and the vehicle. The first charging control apparatus is provided with an outputting device for transmitting a first signal which is a signal for designating a signal outputted from each of the plurality of charging apparatuses, to each of the plurality of charging apparatuses when the one charging apparatus and the vehicle are correlated; a detecting device for detecting a third signal which is transmitted by wireless communication from the vehicle and which is a signal corresponding to a second signal which is a signal outputted from the one charging apparatus due to the transmitted first signal when the one charging apparatus and the vehicle are correlated; and a distinguishing device for correlating the one charging apparatus with the vehicle on the basis of the transmitted first signal and the detected third signal when the one charging apparatus and the vehicle are correlated.

According to the first charging control apparatus of the present invention, the first charging control apparatus is a charging control apparatus for controlling wireless charging between (i) one of a plurality of charging apparatuses and (ii) the vehicle. Here, the "wireless charging" shows a technology of wirelessly supplying electric power and charging a battery. As specific types of the wireless charging, for example, there are an electromagnetic induction type, a microwave wireless type (a radio reception type), a magnetic field coupling resonance type, and the like. Incidentally, the details of the wireless charging correlate weakly with the subject matter of the present invention, and the explanation thereof will be thus omitted here.

"Controlling the wireless charging" means receiving various signals such as, for example, a charging voltage command value, an outputtable voltage value, and a battery remaining capacity and electronically controlling various members such as, for example, a switch in a charging circuit, such that the wireless charging is appropriately performed between the charging apparatus and the vehicle.

Each of the plurality of charging apparatuses can charge, in a wireless manner, the battery such as, for example, a lithium ion battery and a nickel hydrogen battery, which is installed in the vehicle such as, for example, a hybrid vehicle and an electric vehicle, parked in a predetermined parking space.

The plurality of charging apparatuses and the vehicle are connected to each other via the communication relay apparatus such as, for example, an access point. Particularly in the present invention, the vehicle and the communication relay apparatus are connected by the wireless communication. On the other hand, each of the plurality of charging apparatuses and the communication relay apparatus may be connected by wired communication using, for example, an optical fiber cable, or may be connected by the wireless communication.

According to the study of the present inventors, the following has been found; namely, in many cases, the charging apparatus is disposed in a parking lot, and the battery installed in the vehicle parked in the parking lot is charged by the disposed charging apparatus. In this case, in view of convenience of users, the plurality of charging apparatuses are desirably disposed in one parking lot having a plurality of parking spaces. Moreover, if a wireless type charging apparatus is introduced, it is possible to reduce a working load of the user, such as, for example, connecting a charging cable to the vehicle.

By the way, in the case of the wireless type charging apparatus, the charging apparatus and the vehicle are connected typically by the wireless communication. If there are a plurality of charging apparatuses, there is a possibility that correlation between the charging apparatus and the vehicle (hereinafter referred to as "pairing", as occasion demands) is not appropriately performed. There is also considered a method in which a sensor such as, for example, a pressure sensitive sensor, is disposed in the parking space and the pairing is performed on the basis of an output of the sensor; however, there is a possibility that installation cost of the charging apparatuses is relatively expensive.

The first charging control apparatus of the present invention is thus provided with the outputting device, the detecting device, and the distinguishing device. The outputting device transmits the first signal which is a signal for designating a signal outputted from each of the plurality of charging apparatuses, to each of the plurality of charging apparatuses when the one charging apparatus and the vehicle are correlated. Incidentally, the charging apparatus to which the first signal is transmitted is typically a charging apparatus which is not subject to the pairing (i.e. which is not used).

The detecting device detects the third signal which is transmitted by the wireless communication from the vehicle and which is a signal corresponding to the second signal which is a signal outputted from the one charging apparatus due to the transmitted first signal. Here, the "second signal" is outputted directly to the vehicle from the one charging apparatus without via the communication relay apparatus.

In the present invention, it is configured such that one of the plurality of charging apparatuses outputs to the vehicle the second signal which is a signal due to the first signal, if receiving the first signal transmitted from the outputting device. The vehicle is configured to transmit to the first charging control apparatus the third signal which is a signal corresponding to the second signal, if receiving the second signal outputted from the one charging apparatus. Then, the detecting device which constitutes the first charging control apparatus detects the third signal transmitted from the vehicle.

The distinguishing device which is provided, for example, with a memory, a processor, a comparator, and the like, correlates the one charging apparatus with the vehicle on the basis of the transmitted first signal and the detected third signal. Incidentally, which charging apparatus out of the plurality of charging apparatuses outputs the second signal to the vehicle may be specified (i) by changing timing in which the first signal is transmitted to each of the plurality of charging apparatuses and in accordance with timing in which the third signal is detected, or (ii) by changing a pattern of a signal transmitted as the first signal for each charging apparatus and in accordance with the detected third signal.

As a result, according to the first charging control apparatus of the present invention, it is possible to appropriately perform the pairing between one of the plurality of charging apparatuses and the vehicle. In addition, since there is no need to provide some device only to perform the pairing between the one charging device and the vehicle, the installation cost of the charging apparatuses can be suppressed, which is extremely useful in practice.

In one embodiment of the first charging control apparatus of the present invention, the outputting device transmits the first signal, sequentially at predetermined time intervals, to each of the plurality of charging apparatuses.

According to this aspect, the one charging apparatus can be specified, relatively easily.

Alternatively, in other embodiment of the first charging control apparatus of the present invention, the outputting device transmits a plurality of signals which correspond to the respective plurality of charging apparatuses and which have different patterns from each other, as the first signal, at a time, to each of the plurality of charging apparatuses.

According to this aspect, the one charging apparatus can be specified, relatively easily.

The charging system of the present invention is provided with, in order to solve the above-mentioned subject, a plurality of charging apparatuses which are configured to perform wireless charging on a battery installed in a vehicle; and a communication relay apparatus which is configured to relay communication between the plurality of charging apparatuses and the vehicle, wherein. The communication relay apparatus transmits a first signal which is a signal for designating a signal outputted from each of the plurality of charging apparatuses, to each of the plurality of charging apparatuses when one of the plurality of charging apparatuses and the vehicle are correlated. Each of the plurality of charging apparatuses outputs a second signal which is a signal based on the transmitted first signal when one of the plurality of charging apparatuses and the vehicle are correlated. The communication relay apparatus (i) detects a third signal which is transmitted by wireless communication from the vehicle and which is a signal corresponding to the second signal outputted from the one charging apparatus, and (ii) correlates the one charging apparatus with the vehicle on the basis of the transmitted first signal and the detected third signal en one of the plurality of charging apparatuses and the vehicle are correlated.

According to the charging system of the present invention, the charging system is provided with the plurality of charging apparatuses and the communication relay apparatus. When one of the plurality of charging apparatuses and the vehicle are correlated, the communication relay apparatus transmits the first signal which is a signal for designating a signal outputted from each of the plurality of charging apparatuses, to each of the plurality of charging apparatuses. Each of the plurality of charging apparatuses which receives the transmitted first signal outputs to the vehicle the second signal which is a signal based on the first signal.

The communication relay apparatus (i) detects the third signal which is transmitted by the wireless communication from the vehicle, and (ii) correlates the one charging apparatus with the vehicle on the basis of the transmitted first signal and the detected third signal. Incidentally the communication relay apparatus which constitutes the charging system of the present invention corresponds to the first charging control apparatus of the present invention described above.

According to the charging system of the present invention, as in the first charging control apparatus of the present invention described above, it is possible to appropriately perform the pairing between one of the plurality of charging apparatuses and the vehicle.

In one embodiment of the charging system of the present invention, each of the plurality of charging apparatuses has a power supplying device which is configured to supply electric power in a wireless manner to the battery, and the power supplying device outputs a power pattern based on the transmitted first signal, as the second signal.

According to this aspect, the second signal can be transmitted directly to the vehicle from the one charging apparatus without via the communication relay apparatus.

In this embodiment, voltage of the electric pattern may lower than voltage when wireless charging is performed on the battery.

By virtue of such a configuration, even if the second signal is outputted from the charging apparatus corresponding to the parking space in which the vehicle is not parked, it is possible to prevent defects from occurring in the charging apparatus.

The second charging control apparatus of the present invention is, in order to solve the above-mentioned subject, a charging control apparatus for controlling wireless charging between (i) one of a plurality of charging apparatuses which are configured to perform wireless charging on a battery installed in a vehicle and (ii) the vehicle which communicates with the one charging apparatus via a communication relay apparatus which is configured to relay communication between the plurality of charging apparatuses and the vehicle. The charging control apparatus is provided with a detecting device for detecting a second signal which is a signal outputted from the one charging apparatus due to a first signal, the first signal being transmitted to each of the plurality of charging apparatuses from the communication relay apparatus, the first signal being a signal for designating a signal outputted from each of the plurality of charging apparatuses when the one charging apparatus and the vehicle are correlated; and a communicating device for transmitting a third signal which is a signal corresponding to the detected second signal, to the communication relay apparatus by wireless communication such that the one charging apparatus and the vehicle are correlated, on the basis of the third signal and the transmitted first signal, in the communication relay apparatus when the one charging apparatus and the vehicle are correlated.

According to the second charging control apparatus of the present invention, the detecting device detects the second signal which is a signal outputted from the one charging apparatus due to the first signal, the first signal being transmitted to each of the plurality of charging apparatuses from the communication relay apparatus when one of the plurality of charging apparatuses and the vehicle are correlated.

The communicating device transmits the third signal which is a signal corresponding to the detected second signal, to the communication relay apparatus by the wireless communication such that the one charging apparatus and the vehicle are correlated, on the basis of the third signal and the transmitted first signal, in the communication relay apparatus.

As a result, the one charging apparatus and the vehicle are correlated on the basis of the third signal and the first signal in the communication relay apparatus. Therefore, according to the second charging control apparatus of the present invention, it is possible to appropriately perform the pairing between one of the plurality of charging apparatuses and the vehicle.

The third charging control apparatus of the present invention is a charging control apparatus for controlling wireless charging between (i) one of a plurality of charging apparatuses which are configured to perform wireless charging on a battery installed in a vehicle and (ii) the vehicle which communicates with the one charging apparatus via a communication relay apparatus which is configured to relay communication between the plurality of charging apparatuses and the vehicle. The charging control apparatus is provided with a receiving device for receiving a first signal corresponding to the one charging apparatus, out of first signals which are outputted from the communication relay apparatus and which are signals for designating signals outputted from the respective plurality of charging apparatuses when the one charging apparatus and the vehicle are correlated; and an outputting device for outputting a second signal which is a signal based on the received first signal, to the vehicle (i) such that the vehicle can transmit a third signal which is a signal corresponding to the second signal, to the communication relay apparatus by wireless communication and (ii) such that the communication relay apparatus can correlate the one charging apparatus with the vehicle on the basis of the transmitted first signal and the transmitted third signal when the one charging apparatus and the vehicle are correlated.

According to the third charging control apparatus of the present invention, the receiving device receives the first signal corresponding to the one charging apparatus, out of first signals which are outputted from the communication relay apparatus and which are signals for designating signals outputted from the respective plurality of charging apparatuses. In other words, the third charging control apparatus is installed in one charging apparatus.

The outputting device outputs the second signal which is a signal based on the received first signal, to the vehicle (i) such that the vehicle can transmit the third signal which is a signal corresponding to the second signal, to the communication relay apparatus by the wireless communication and (ii) such that the communication relay apparatus can correlate the one charging apparatus with the vehicle on the basis of the transmitted first signal and the transmitted third signal.

As a result, the one charging apparatus and the vehicle correlated on the basis of the third signal and the first signal in the communication relay apparatus. Therefore, according to the third charging control apparatus of the present invention, it is possible to appropriately perform the pairing between one of the plurality of charging apparatuses and the vehicle.

The charging control method of the present invention is, in order to solve the above-mentioned subject, a charging control method of controlling wireless charging between (i) one of a plurality of charging apparatuses which are configured to perform wireless charging on a battery installed in a vehicle and (ii) the vehicle which communicates with the one charging apparatus via a communication relay apparatus which is configured to relay communication between the plurality of charging apparatuses and the vehicle. The charging control method is provided with an outputting process of transmitting a first signal which is a signal for designating a signal outputted from each of the plurality of charging apparatuses, to each of the plurality of charging apparatuses when the one charging apparatus and the vehicle are correlated; a detecting process of detecting a third signal which is transmitted by wireless communication from the vehicle and which is a signal corresponding to a second signal which is a signal outputted from the one charging apparatus due to the transmitted first signal when the one charging apparatus and the vehicle are correlated; and a distinguishing process of correlating the one charging apparatus with the vehicle on the basis of the transmitted first signal and the detected third signal when the one charging apparatus and the vehicle are correlated.

According to the charging control method of the present invention, as in the first charging control apparatus of the present invention described above, it is possible to appropriately perform the pairing between one of the plurality of charging apparatuses and the vehicle. Incidentally even the charging control method of the present invention can adopt the same various aspects as those of the first charging control apparatus of the present invention described above.

The first computer program of the present invention, in order to solve the above-mentioned subject, makes a computer function as the first charging control apparatus of the present invention described above (including various embodiments thereof).

According to the first computer program of the present invention, the first charging control apparatus of the present invention described above can be relatively easily realized as the computer provided in the first charging control apparatus reads and executes the computer program from a recording medium for storing the computer program, such as a compact disc read only memory (CD-ROM) and a DVD read only memory (DVD-ROM), or as it executes the computer program after downloading the program through a communication device. By this, as in the first charging control apparatus of the present invention described above, it is possible to appropriately perform the pairing between one of the plurality of charging apparatuses and the vehicle.

The correlation method of the present invention is, in order to solve the above-mentioned subject, a correlation method of correlating one of a plurality of charging apparatuses with a vehicle in a charging system comprising: the plurality of charging apparatuses which are configured to perform wireless charging on a battery installed in the vehicle; and a communication relay apparatus which is configured to relay communication between the plurality of charging apparatuses and the vehicle. The correlation method is provided with a first process in which the communication relay apparatus transmits a first signal which is a signal for designating a signal outputted from each of the plurality of charging apparatuses, to each of the plurality of charging apparatuses, a second process in which each of the plurality of charging apparatuses outputs a second signal which is a signal based on the transmitted first signal, and a third process in which the communication relay apparatus (i) detects a third signal which is transmitted by wireless communication from the vehicle and which is a signal corresponding to the second signal outputted from the one charging apparatus, and (ii) correlates the one charging apparatus with the vehicle on the basis of the transmitted first signal and the detected third signal.

According to the correlation method of the present invention, as in the charging system of the present invention described above, it is possible to appropriately perform the pairing between one of the plurality of charging apparatuses and the vehicle. Incidentally, even the correlation method of the present invention can adopt the same various aspects as those of the charging system of the present in on described above.

The second computer program of the present invention, in order to solve the above-mentioned subject, makes a computer function as the second charging control apparatus of the present invention described above.

According to the second computer program of the present invention, the second charging control apparatus of the present invention described above can be relatively easily realized as the computer provided in the second charging control apparatus reads and executes the computer program from a recording medium for storing the computer program, such as a compact disc read only memory (CD-ROM) and a DVD read only memory (DVD-ROM), or as it executes the computer program after downloading the program through a communication device. By this, as in the second charging control apparatus of the present invention described above, it is possible to appropriately perform the pairing between one of the plurality of charging apparatuses and the vehicle.

The fourth charging control apparatus of the present invention, is, in order to solve the above-mentioned subject, a charging control apparatus for controlling wireless charging between (i) one of a plurality of charging apparatuses which are configured to perform wireless charging on a battery installed in a vehicle and (ii) the vehicle which communicates with the one charging apparatus via a communication relay apparatus which is configured to relay communication between the plurality of charging apparatuses and the vehicle. The charging control apparatus is provided with a communicating device for transmitting a first signal which is a signal for designating a signal outputted from each of the plurality of charging apparatuses, to the communication relay apparatus by wireless communication such that the first signal is transmitted to each of the plurality of charging apparatuses from the communication relay apparatus when the one charging apparatus and the vehicle are correlated; a detecting device for detecting a second signal which is a signal outputted from the one charging apparatus, due to the first signal transmitted to each of the plurality of charging apparatuses from the communication relay apparatus when the one charging apparatus and the vehicle are correlated; and a distinguishing device for correlating the one charging apparatus with the vehicle on the basis of the transmitted first signal and the detected second signal when the one charging apparatus and the vehicle are correlated.

According to the fourth charging control apparatus of the present invention, the communicating device transmits the first signal which is a signal for designating a signal outputted from each of the plurality of charging apparatuses, to the communication relay apparatus by the wireless communication such that the first signal is transmitted to each of the plurality of charging apparatuses from the communication relay apparatus when one of the plurality of charging apparatuses and the vehicle are correlated.

In other words, the communicating device transmits the first signal to each of the plurality of charging apparatuses via the communication relay apparatus. Incidentally, the communicating device transmits the first signal, typically to each of the plurality of charging apparatuses via the communication relay apparatus, sequentially at predetermined time intervals.

The detecting device detects the second signal which is a signal outputted from the one charging apparatus, due to the first signal transmitted to each of the plurality of charging apparatuses from the communication relay apparatus. The distinguishing device, which is provided, for example, with a memory a processor, a comparator, and the like, correlates the one charging apparatus with the vehicle on the basis of the transmitted first signal and the detected second signal.

As a result, according to the fourth charging control apparatus of the present invention, it is possible to appropriately perform the pairing between one of the plurality of charging apparatuses and the vehicle.

The operation and other advantages of the present invention will become more apparent from embodiments explained below.

BRIEF DESCRIPTION OF DRAWINGS

FIG. 8 is a conceptual diagram illustrating another example of the power pattern outputted from the charging infrastructure.

MODES FOR CARRYING OUT THE INVENTION

Hereinafter, embodiments of the charging system of the present invention will be explained on the basis of the drawings.

First Embodiment

A first embodiment of the charging system of the present invention will explained with reference to FIG. 1 to FIG. 5.

Configuration of Charging System

Figure 1:
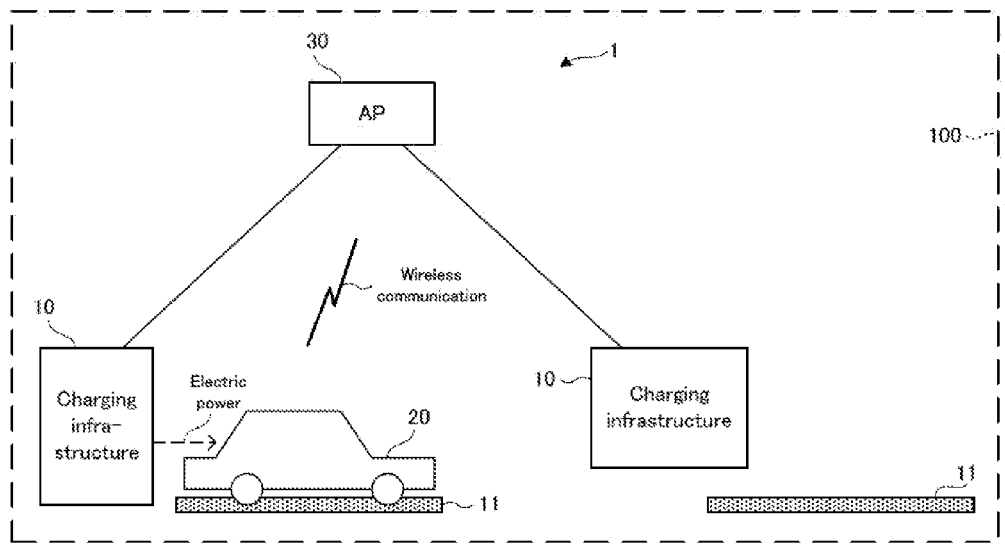
FIG. 1 is a conceptual diagram illustrating an entire configuration of a charging system in a first embodiment.
Figure 2:
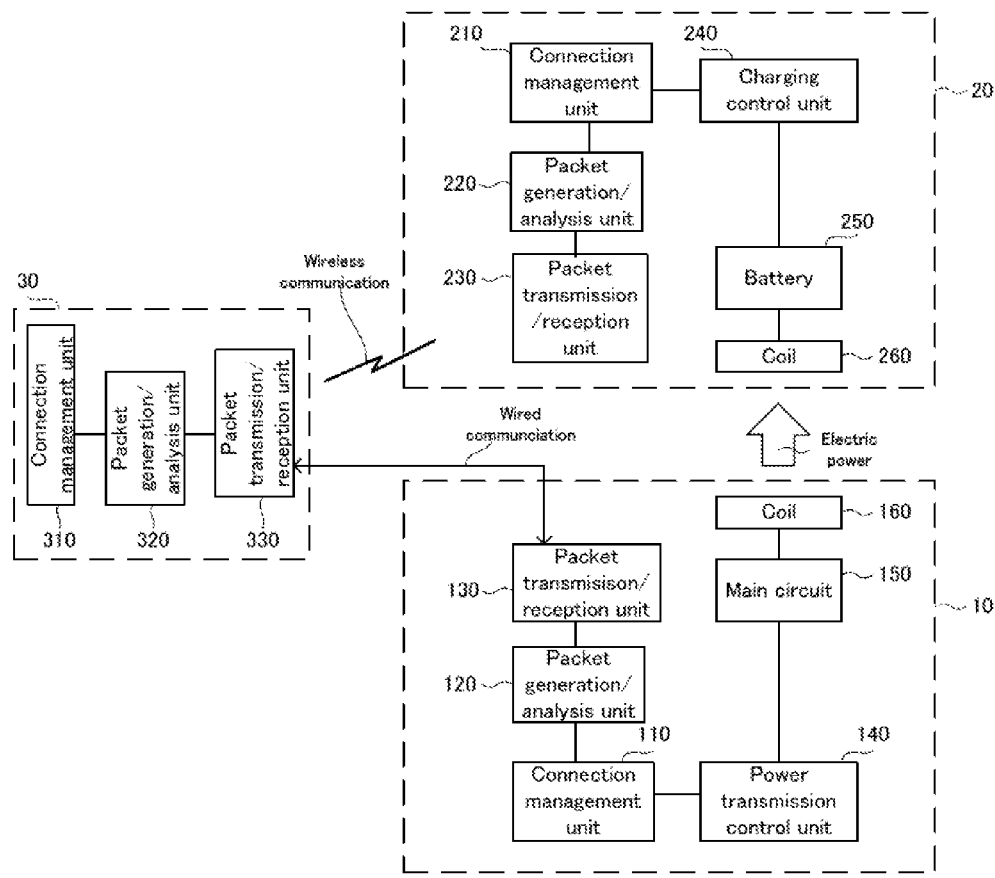
FIG. 2 is a block diagram illustrating the charging system in the first embodiment.

A configuration of the charging system in the first embodiment will be explained with reference to FIG. 1 and FIG. 2. FIG. 1 is a conceptual diagram illustrating an entire configuration of the charging system in the first embodiment. FIG. 2 is a block diagram illustrating the charging system in the first embodiment.

In FIG. 1, a charging system 1 constitutes one charging base (so-called charging stand) in a parking lot 100 such as, for example, parking lots in buildings of companies and local governments, or parking lots in shopping centers. The charging system 1 is provided with a plurality of charging infrastructures 10 (hereinafter, referred to as "charging infrastructures", as occasion demands) and an access point (AP) 30. Incidentally, the "charging infrastructure 10" and the "access point 30" in the first embodiment are one example of the "charging apparatus" and the "communication relay apparatus" of the present invention, respectively.

One charging infrastructure 10 is provided for one charging space 11 (i.e. parking space). For the communication between each of the charging infrastructures 10 and the access point 30, a wired communication network such as, for example, an optical fiber cable and a coaxial cable is used.

In FIG. 2, the charging infrastructure 10 is provided with a connection management unit 110, a packet generation/analysis unit 120, a packet transmission/reception unit 130, a power transmission control unit 140, a main circuit 150, and a coil 160.

A vehicle 20 such as, for example, an electric vehicle and a hybrid vehicle is provided with a connection management unit 210, a packet generation/analysis unit 220, a packet transmission/reception unit 230, a charging control unit 240, a battery 250 such as, for example, a lithium ion battery and a nickel hydrogen battery, and a coil 260. Incidentally, the "battery 250" of the present invention is one example of the "battery" of the present invention.

The access point 30 is provided with a connection management unit 310, a packet generation/analysis unit 320, and a packet transmission/reception unit 330.

The charging infrastructure 10 is configured to supply the battery 250 installed in the vehicle 20, with electric power in a wireless manner from the exterior, for example, on the basis of a mutual in the coil 260 induction effect of electromagnetic induction. Specifically, the charging infrastructure 10 is configured such that electric power is transmitted from the coil 160 to the coil 260 because induced electromotive force is generated in the coil 260 due to magnetic flux formation in the coil 160, between the coil 160 which is a coil on a power supply side (i.e., on the side of the charging infrastructure 10) and the coil 260 which is a coil on a charging side (i.e. on the side of the vehicle 20).

Incidentally, the distance between the coil 160 of the charging infrastructure 10 and the coil 260 installed in the vehicle 20 upon power supply is, for example, 10 to 25 cm (centimeters) or the like.

The power transmission control unit 140 of the charging infrastructure 10 controls the main circuit, which is provided, for example, with a converter, an inverter, a rectifier, a switch and the like, upon power supply, such that appropriate magnetic flux is formed in the coil 160. The power transmission control unit 140 further transmits to the connection management unit 110 information associated with charging such as, for example, an outputtable voltage value, a current output voltage value, and a current charging current, value (hereinafter referred to as "infrastructure-side charging control information", as occasion demands).

On the other hand, the charging control unit 240 of the vehicle 20 controls the battery 250 and its surrounding circuits (not illustrated) or the like upon power supply, such that the battery 250 is appropriately charged. The charging control unit 240 further transmits to the connection management unit 210 information associated with charging such as, for example, a battery remaining capacity and a charging current command value (hereinafter referred to as "vehicle-side charging control information", as occasion demands).

The connection management unit 110 of the charging infrastructure 10 controls the packet generation/analysis unit 120 to packetize various pieces of information including the infrastructure-side charging control information and transmit it to the access point 30 via the packet transmission/reception unit 130. The connection management unit 110 further controls the packet generation/analysis unit 120 to restore the original information from packets received via the packet transmission/reception unit 130.

In the same manner, the connection management unit 210 of the vehicle 20 controls the packet generation analysis unit 220 to packetize various pieces of information including the vehicle-side charging control information and transmit it to the access point 30 via the packet transmission/reception unit 230. The connection management unit 210 further controls the packet generation/analysis unit 220 to restore the original information from packets received via the packet transmission/reception unit 230.

The connection management unit 310 of the access point 30 controls the packet generation/analysis unit 320 to analyze packets received via the packet transmission reception unit 330. The connection management unit 310 further controls the packet generation/analysis unit 320 to transmit the packets to a predetermined determination (here, one of the plurality of charging infrastructures 10 and a plurality of vehicles 20) based on an analysis result, via the packet transmission/reception unit 330.

The charging system 1 needs only one access point 30. Thus, installation cost can be reduced, for example, in comparison with a charging system which is provided with the access point for each charging infrastructure, and it is extremely useful in practice.

(Pairing Processing)

In the charging system 1 as configured above, the charging infrastructure 10 and the charging space 11 are not provided with a member such as, for example, a sensor for recognizing the vehicle 20. In addition, the charging infrastructure 10 and the vehicle 20 always communicate with each other via the access point 30. Thus, in the charging system 1, it is necessary to perform the pairing between the charging infrastructure 10 and the vehicle 20 (in other words, to recognize which charging infrastructure 10 is used to park the vehicle 20 in the charging space 11 corresponding to the charging infrastructure 10) before charging the battery 250 installed in the vehicle 20.

Hereinafter, the paring processing in the first embodiment will explained with reference to flowcharts in FIG. 3 and FIG. 4, and FIG. 5.

Figure 3:
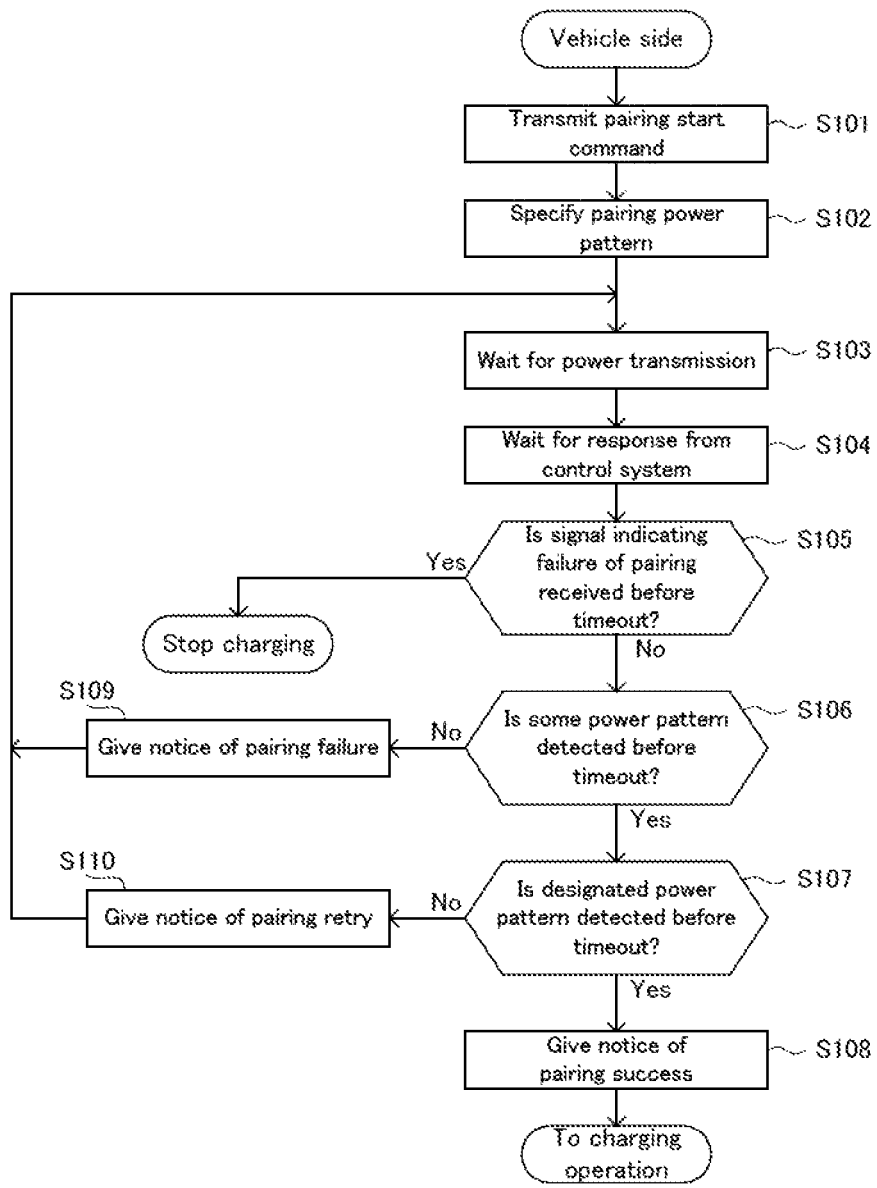
FIG. 3 is a flowchart illustrating pairing processing (on a vehicle side) in the first embodiment.

In FIG. 3, firstly, if a switch (not illustrated) associated with the charging of the battery 250 is pressed by a driver of the vehicle 20 parked in one charging space 11, the connection management unit 210 of the vehicle 20 controls the packet generation/analysis unit 220 to packetize a signal indicating a pairing start command and transmit it to the access point 30 (step S101).

Then, the connection management unit 210 controls the packet generation/analysis unit 220 to packetize a power pattern signal as one example of the "first signal" of the present invention, which is a signal for specifying a power pattern outputted from the charging infrastructure 10, and transmit it to the access point 30 (step S102). Here, the "power pattern outputted from the charging infrastructure 10" means a power pattern of the induced electromotive force generated in the coil 260 of the vehicle 20 due to the magnetic flux formed in the coil 160 of the charging infrastructure 10.

Then, the connection management unit 210 of the vehicle 20 becomes in a stand-by state until electric power is transmitted from one charging infrastructure 10 due to the transmitted power pattern, or until some response is received from the access point 30 (step S103, S104).

Figure 4:
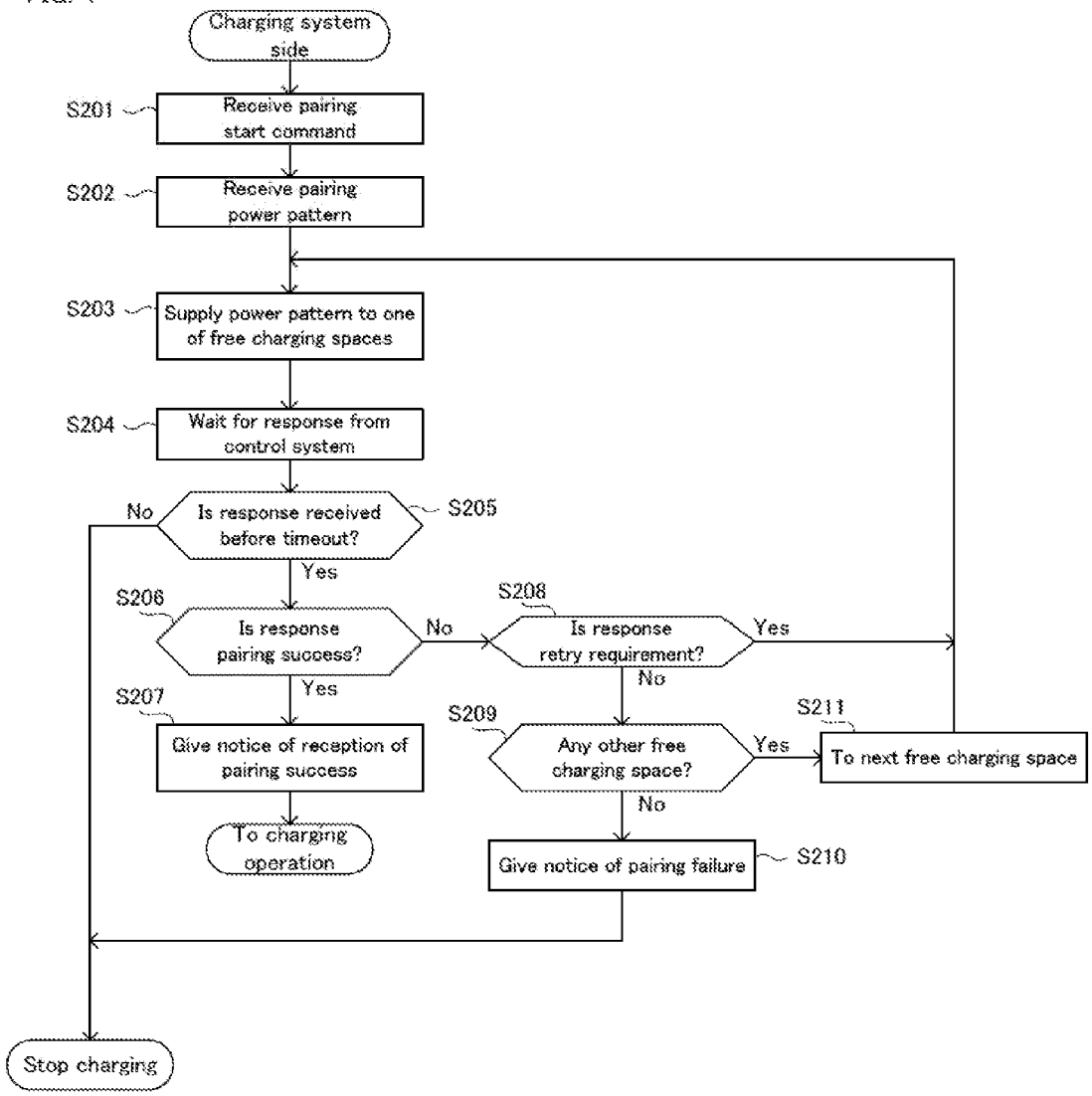
FIG. 4 is a flowchart illustrating pairing processing (on a charging system side) in the first embodiment.

On the other hand, in FIG. 4, if the connection management unit 310 of the access point 30 receives the signal indicating the paring start command transmitted from the vehicle 20 (step S201) and receives the transmitted power pattern signal (step S202), then, the connection management unit 310 controls the packet generation analysis unit 320 to packetize the received power pattern signal and transmit it to one charging infrastructure 10 corresponding to one unused charging space 11 out of a plurality of charging spaces 11 (step S203).

Then, the connection management unit 310 becomes in the stand-by state until some response is received from the vehicle 20 (step S204).

The connection management unit 110 of one charging infrastructure 10 which receives the power pattern signal transmitted in the processing in the step S203 transmits the received power pattern signal to the charging control unit 140. The charging control unit 140 controls the main circuit 150 such that the magnetic flux is formed in the coil 160 in accordance with the power pattern indicated by the transmitted power pattern signal.

If the charging infrastructure 10 corresponding to the charging space 11 in which the vehicle 20 which transmits the power pattern signal in the processing in the step S102 (refer to FIG. 3) is parked is the charging infrastructure 10 which receives the power pattern signal transmitted from the access point 30, then, the induced electromotive force is generated in the coil 260 of the vehicle 20, and electric power is supplied from the charging infrastructure 10 to the vehicle 20.

Figure 5:
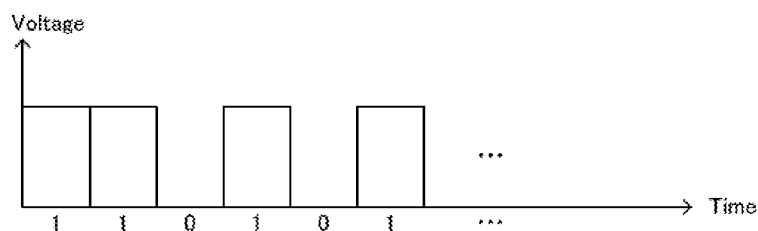
FIG. 5 is a conceptual diagram illustrating one example of a power pattern outputted from a charging infrastructure.

Incidentally, the pattern of the electric power supplied to the vehicle 20 (i.e. the pattern according to the power pattern signal) is, for example, as illustrated in FIG. 5. Here, a voltage value is set to be lower than a voltage value in normal power supply, so that an intense electric field is not formed in the charging space 11 in a non-load state in which the vehicle 20 is not parked). FIG. 5 is a conceptual diagram illustrating one example of the power pattern outputted from the charging infrastructure.

On the other hand, if the charging infrastructure 10 corresponding to the charging space 11 in which the vehicle 20 which transmits the power pattern signal is parked is not the charging infrastructure 10 which receives the power pattern signal transmitted from the access point 30, then, the induced electromotive force is not generated in the coil 260 of the vehicle 20 (i.e. electric power is not supplied).

Back in FIG. 3 again, the connection management unit 210 of the vehicle 20 determines whether or not a signal indicating pairing failure is received at a time point after a lapse of predetermined time (e.g. 20 seconds, etc.) after it becomes in the standby state (i.e. at a time point of timeout), at a time point at which the generation of the induced electromotive force in the coil 260 is detected, or at a time point at which some signal is received (step S105).

If it is determined that the signal indicating the pairing failure is received (the step S105: Yes), the connection management unit 210 transmits a signal indicating a charging stop to the charging control unit 240 and displays an error message, for example, on a monitor disposed in an instrumental panel (not illustrated) of the vehicle 20 (and/or issues an alarm from a speaker).

If it is determined that the signal indicating the pairing failure is not received (the step S105: No), the connection management unit 210 determines whether or not some power pattern is detected (i.e. whether or not the induced electromotive force is generated in the coil 260) (step S106).

If it is determined that the power pattern is not detected (i.e. that the induced electromotive force is not generated in the coil 260) (the step S106: No), it is considered that the charging infrastructure 10 to which the power pattern signal is transmitted in the processing in the step S203 (refer to FIG. 4) is not the charging infrastructure 10 corresponding to the caring space 11 in which the vehicle 20 is parked, and thus, the connection management unit 210 controls the packet generation/analysis unit 220 to packetize the signal indicating the pairing failure and transmit it to the access point 30 (step S109) and becomes in the stand-by state again.

If it is determined that the power pattern, as one example of the "second signal" of the present invention, is detected (the step S106: Yes), the connection management unit 210 compares the power pattern indicated by the power pattern signal transmitted in the processing in the step S102, with the detected power pattern. Then, the connection management unit 210 determines whether or not the designated power pattern is detected (i.e. whether or not the power pattern indicated by the power pattern signal transmitted in the processing in the step S102 matches the detected power pattern) (step S107).

If it is determined that the designated power pattern is not detected (the step S107: No), the connection management unit 210 controls the packet generation/analysis unit 220 to packetize a signal indicating a pairing retry and transmit it to the access point 30 (step S110) and becomes in the stand-by state again.

If it is determined that the designated power pattern is detected (the step S107: Yes), the connection management unit 210 controls the packet generation/analysis unit 220 to packetize a signal indicating pairing success and transmit it to the access point 30 (step S108) and transmits a signal indicating a charging start to the charging control unit 240.

Back in FIG. 4 again, the connection management unit 310 of the access point 30 determines whether or not some signal is received at a time point after a lapse of predetermined time (e.g. 60 seconds, etc.) after it becomes in the standby state (i.e. at a time point of timeout), or at a time point at which some signal is received from the vehicle 20 which transmits the signal indicating the pairing start command received in the processing in the step S201 (step S205). Incidentally, whether or not the signal is from the vehicle 20 which transmits the signal indicating the pairing start command may be determined, for example, with reference to packet transmission source ID (Identification Data) or the like.

If it is determined that the signal is not received (the step S205: No), the connection management unit 310 controls the packet generation/analysis unit 320 to packetize the signal indicating the charging stop and transmit it to the charging infrastructure 10 which transmits the power pattern signal in the processing in the step S203.

If it is determined that the signal is received (the step S205: Yes), the connection management unit 310 determines whether or not the received signal is the signal indicating the pairing success (step S206). If it is determined that the signal indicating the pairing success is received (the step S206: Yes), the connection management unit 310 controls the packet generation/analysis unit 320 to packetize a signal indicating the reception of the signal indicating the pairing success and transmit it to the vehicle 20 (step S207), and controls packet generation/analysis unit 320 to packetize the signal indicating the charging start and transmit it to the charging infrastructure 10 which receives the power pattern signal in the processing in the step S203.

If it is determined that the received signal is not the signal indicating the pairing success is received (the step S206: No), the connection management unit 310 determines whether or not the received signal is the signal indicating the pairing retry (step S208). If it is determined that the received signal is the signal indicating the pairing retry (the step S208: Yes), the connection management unit 310 controls the packet generation/analysis unit 320 to packetize the power pattern signal again and transmit it to the charging infrastructure 10 which transmits the power pattern signal in the previous time.

If it is determined that the received signal is not the signal indicating the pairing retry (the step S208: No), the connection management unit 310 determines ether not there is the charging infrastructure 10 which corresponds to the unused charging space 11 out of the plurality of charging spaces 11 and to which the power pattern signal has not been transmitted yet (step S209).

If it is determined that there is the charging infrastructure 10 which corresponds to the unused charging space 11 and to which the power pattern signal has not been transmitted yet (the step S209: Yes), the connection management unit 310 controls the packet generation/analysis unit 320 to packetize the power pattern and transmit it to one charging infrastructure 10, out of the charging infrastructures 10, which corresponds to the unused charging space 11 and to which the power pattern signal has not been transmitted yet (step S211).

If it is determined that there is no charging infrastructure 10 that corresponds to the unused charging space 11 and to which the power pattern signal has not been transmitted yet (the step S209: No), the connection management unit 310 controls the packet generation/analysis unit 320 to packetize the signal indicating the pairing failure and transmit it to the vehicle 20 (step S210), and controls the packet generation/analysis unit 320 to packetize the signal indicating the charging start and transmit it to the charging infrastructure 10 which transmits the power pattern signal in the processing in the step S203.

The "connection management unit 210", the "packet generation/analysis unit 220", the "packet transmission/reception unit 230", and the "coil 260" in the first embodiment are one example of the "fourth charging control apparatus" of the present invention. The "connection management unit 210" and the "coil 260" in the first embodiment are one example of the "distinguishing device" and the "detecting device" of the "fourth charging control apparatus" of the present invention, respectively. The "packet generation/analysis unit 220" and the "packet transmission/reception unit 230" in the first embodiment are one example of the "communicating device" of the "fourth charging control apparatus" of the present invention.

Second Embodiment

A second embodiment of the charging system of the present invention will be explained with reference to FIG. 6 to FIG. 8. Incidentally, the second embodiment has the same configuration as that of the first embodiment, except that the pairing processing is different. Thus, in the second embodiment, the explanation that overlaps with the first embodiment will be omitted, and common portions on the drawings will carry the same reference numerals. Basically, only different points will be explained with reference to FIG. 6 to FIG. 8.

(Paring Processing)

Figure 6:
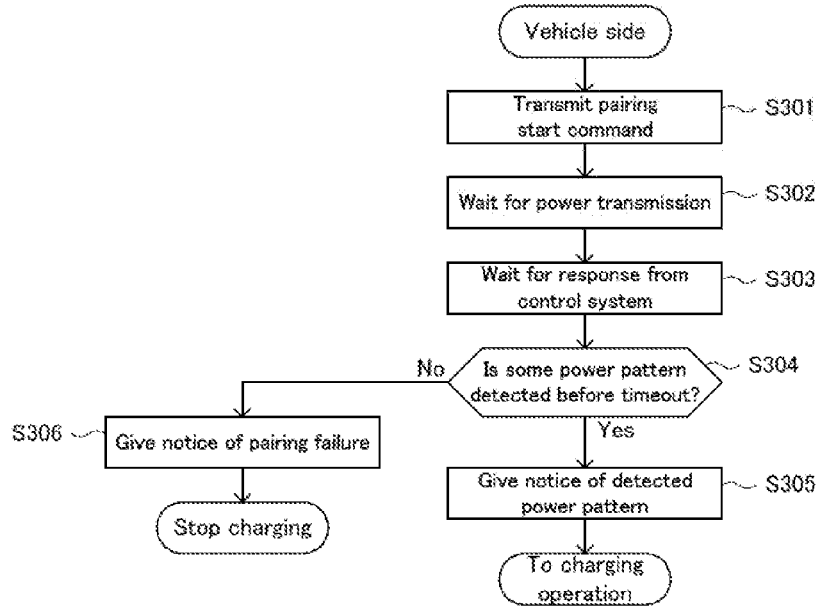
FIG. 6 is a flowchart illustrating pairing processing (on the vehicle side) in a second embodiment.

In a flowchart in FIG. 6, firstly, if a switch (not illustrated) associated with the charging of the battery 250 is pressed down by the driver of the vehicle 20 parked in one charging space 11, the connection management unit 210 of the vehicle 20 controls the packet generation/analysis unit 220 to packetize the signal indicating the pairing start command and transmit it to the access point 30 (step S301).

Then, the connection management unit 210 of the vehicle 20 becomes in the stand-by state until electric power is transmitted from one charging infrastructure 10, or until some response is received from the access point 30 (step S302, S303).

Figure 7:
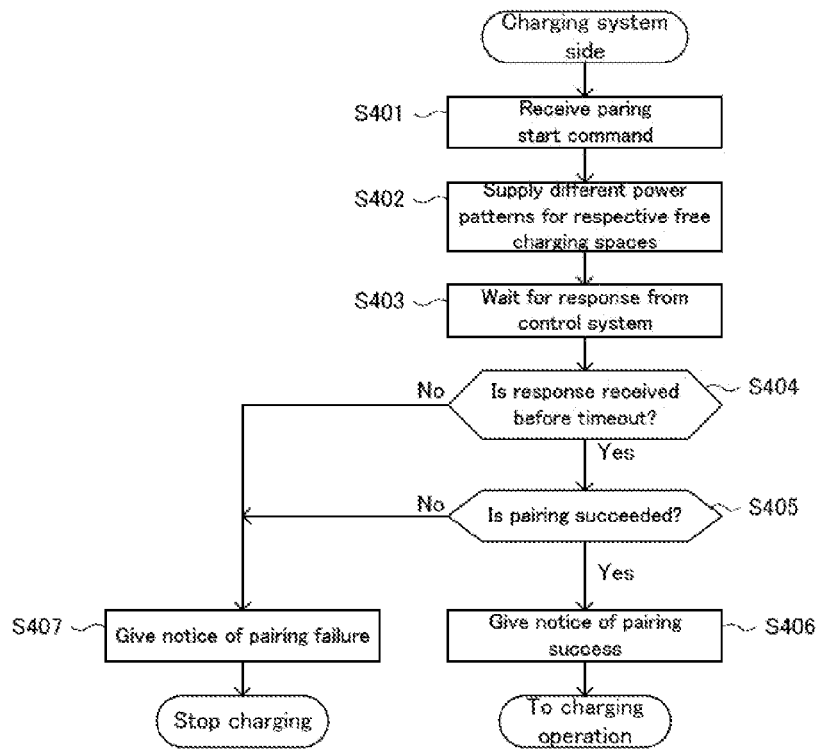
FIG. 7 is a flowchart illustrating pairing processing (on the charging system side) in the second embodiment.

On the other hand, in a flowchart in FIG. 7, if the connection management unit 310 of the access point 30 receives the signal indicating the paring start command transmitted from the vehicle 20 (step S401), then, the connection management unit 310 controls the packet generation/analysis unit 320 to packetize power pattern signals as another example of the "first signal" of the present invention and transmit them to respective charging infrastructures 10 corresponding to unused charging spaces 11 out of the plurality of charging spaces, wherein the power pattern signals are signals for specifying power patterns outputted from the respective charging infrastructure 10 and having different patterns from each other (step S402).

Incidentally, the connection management unit 310 may transmit the electric pattern signals to the respective charging infrastructures 10, (i) sequentially at predetermined tune intervals, or (ii) at a time.

Then, the connection management unit 310 becomes in the stand-by state until some response is received from the vehicle 20 (step S403).

The connection management unit 110 of each of the charging infrastructures 10 which receive the power pattern signals transmitted in the step S402 described above transmits the received power pattern signal to the charging control unit 140. The charging control unit 140 controls the main circuit 150 such that magnetic flux according to the power pattern indicated by the transmitted power pattern signal, for example, as illustrated in FIG. 8, is formed in the coil 160.

FIG. 8 is a conceptual diagram illustrating another example of the power pattern outputted from the charging infrastructure, in the same concept as that of FIG. 5. A power pattern signal illustrated in Pattern 1 in FIG. 8 is transmitted to one charging infrastructure 10 out of the plurality of charging infrastructures 10, and a power pattern signal illustrated in Pattern 2 in FIG. 8 is transmitted to another charging infrastructure 10. Thus, the charging infrastructure 10 corresponding to the vehicle 20 can be specified from the power pattern detected in the vehicle 20.

Back in FIG. 6 again, the connection management unit 210 of the vehicle 20 determines whether or not some power pattern is detected at a time point after a lapse of predetermined time after it becomes in the standby state, at a time point at which the generation of the induced electromotive force in the coil 260 is detected, or at a time point at which some signal is received (step S304).

If it is determined that the power pattern is not detected (the step S304: No), the connection management unit 210 controls the packet generation/analysis unit 220 to packetize the signal indicating the pairing failure and transmit it to the access point 30 (step S306), and transmits the signal indicating the charging stop to the charging control unit 240.

If it is determined that the power pattern is detected (the step S304: Yes), the connection management unit 210 controls the packet generation/analysis unit 220 to packetize a signal indicating the detected power pattern as one example of the "third signal" of the present invention and transmit it to the access point 30 (step S305), and transmits the signal indicating the charging start to the charging control unit 240.

Back in FIG. 7 again, the connection management unit 310 of the access point 30 determines whether or not the signal is received at a time point after at a time point after a lapse of predetermined time after it becomes in the standby state, or at a time point at which some signal is received from the vehicle 20 which transmits the signal indicating the pairing start command received in the processing in the step S201 (step S404).

If it is determined that the signal is received (the step S404: Yes), the connection management unit 310 determines whether or not the pairing is successful (i.e. whether or not there is a signal corresponding to the signal indicating the power pattern transmitted in the processing in the step S305 (refer to FIG. 6), among the power pattern signals transmitted in the processing in the step S402 (step S405).

If it is determined that the pairing is successful (the step S405: Yes), the connection management unit 310 controls the packet generation/analysis unit 320 to packetize the signal indicating the pairing success and transmit it to the vehicle 20 (step S406), and controls the packet generation/analysis unit 320 to packetize the signal indicating the charging start and transmit it to the charging infrastructure 10 which transmits, in the processing in the step S402, the power pattern signal corresponding to the signal indicating pattern transmitted in the processing in the step S305.

If it is determined in the processing in the step S404 that the signal is not received (the step S404; No), or if it is determined in the processing in the step S405 that the pairing is failed (the step S405; No), then, the connection management unit 310 controls the packet generation/analysis unit 320 to packetize the signal indicating the pairing failure and transmit it to the vehicle 20 (step S407), and controls the packet generation/analysis unit 320 to packetize the signal indicating the charging stop and transmit it to all the charging infrastructures 10 that transmit the power pattern signals in the processing in the step S402.

The "connection management unit 310" the "packet generation/analysis unit 320", and the "packet transmission/reception unit 330" in the second embodiment are one example of the "first charging control apparatus" of the present invention. The "connection management unit 310" in the second embodiment is one example of the "distinguishing device" of the "first charging control apparatus" of the present invention. The "packet generation/analysis unit 320" and the "packet transmission/reception unit 330" in the second embodiment are one example of the "outputting device" and the "detecting device" of the "first charging control apparatus" of the present invention.

The "packet generation/analysis unit 220", and the "packet transmission/reception unit 230" and the "coil 260" in the second embodiment are one example of the "second charging control apparatus" of the present invention. The "coil 260" in the second embodiment is one example of the "detecting device" of the "second charging control apparatus" of the present invention. The "connection management unit 210", the "packet generation/analysis unit 220", and the "packet transmission/reception unit 230" in the second embodiment are one example of the "communicating device" of the "second charging control apparatus" of the present invention.

The "packet generation/analysis unit 120", the "packet transmission/reception unit 130", the "power transmission control unit 140", the "main circuit 150", and the "coil 160" in the second embodiment are one example of the "third charging control apparatus" of the present invention. The "packet generation/analysis unit 120" and the "packet transmission/reception unit 130" are one example of the "receiving device" of the "third charging control apparatus" of the present invention. The "power transmission control unit 140", the "main circuit 150", and the "coil 160" in the second embodiment are one example of the "outputting device" of the "third charging control apparatus" of the present invention.

Incidentally, as the charging system 1 in the embodiments described above, the charging system of an electromagnetic induction type is listed. The present invention, however, is not limited to the charging system of the electromagnetic induction type, and can be applied to a system which adopts various wireless charging methods, such as, for example, of a radio reception type and of a magnetic field coupling resonance type. Specifically, for example, if the charging system of the radio reception type is adopted as the charging system 1 in the embodiments described above, the "coil 160" and the "coil 260" in the embodiments may be interpreted as "antennas".

The present invention is not limited to the aforementioned embodiments, but various changes may be made, if desired, without departing from the essence or spirit of the invention which can be read from the claims and the entire specification. A charging control apparatus and method, a charging system, a correlation method, and a computer program, which involve such changes, are also intended to be within the technical scope of the present invention.

DESCRIPTION OF REFERENCE CODES 1 charging system
10 charging infrastructure
11 charging space
20 vehicle
30 access point
100 parking lot 110, 210, 310 connection management unit
120, 220, 320 packet generation/analysis unit
130, 230, 330 packet transmission/reception unit
140 power transmission control unit
150 main circuit
160, 260 coil
240 charging control unit
250 battery

The invention claimed is:

1. A charging control apparatus for controlling a plurality of charging apparatuses, each of the charging apparatuses being configured to be capable of supplying electric power to a vehicle through a predetermined power supplying path, wherein
the charging control apparatus is configured to perform pairing between the vehicle and one of the plurality of charging apparatuses based on a signal outputted from the vehicle which detects a first electric power having predetermined power pattern, the first electric power is supplied from the one of the plurality of charging apparatuses to the vehicle via the predetermined power supplying path,
the charging control apparatus controls at least one charging apparatus such that at least one charging apparatus supplies the first electric power to the vehicle in response to a request from the vehicle.

2. The charging control apparatus according to claim 1, wherein
the predetermined power supplying path is a path which is used to supply second electric power for charging a battery of the vehicle.

3. A non-transitory computer readable recording medium recording thereon a computer program, wherein
the computer program makes a computer function as the charging control apparatus according to claim 1.

4. A charging control apparatus mounted on a vehicle to which each of a plurality of charging apparatuses supplies electric power through a predetermined power supplying path, wherein
the charging control apparatus is configured to output signal, which is used to perform pairing between the vehicle and one of the plurality of charging apparatuses, based on a detection result of a first electric power having predetermined power pattern, the first electric power is supplied from the one of the plurality of charging apparatuses to the vehicle via the predetermined power supplying path,
the charging control apparatus requests another charging control apparatus which controls the plurality of charging apparatuses to allow at least one charging apparatus to supply the first electric power to the vehicle.

5. The charging control apparatus according to claim 4, wherein
the predetermined power supplying path is a path which is used to supply second electric power for charging a battery of the vehicle.

6. A charging control apparatus mounted on one of a plurality of charging apparatuses, each of the plurality of charging apparatuses being configured to be capable of supplying electric power to a vehicle through a predetermined power supplying path, wherein
the charging control apparatus is configured to supply a first electric power having predetermined power pattern to the vehicle via the predetermined power supplying path such that pairing between the vehicle and the one of the plurality of charging apparatuses is performed based on a signal outputted from the vehicle which detects the first electric power,
the charging control apparatus supplies the first electric power to the vehicle after another charging control apparatus which controls the plurality of charging apparatuses receives a predetermined request from the vehicle, the predetermined request requesting at least one charging apparatus to supply the first electrical power to the vehicle.

7. The charging control apparatus according to claim 6, wherein
the predetermined power supplying path is a path which is used to supply second electric power for charging a battery of the vehicle.

8. A charging system comprising:
a plurality of charging apparatuses each of which is configured to be capable of supplying electric power to a vehicle through a predetermined power supplying path; and
a single communication relay apparatus which is configured to be capable of relaying communication between the plurality of charging apparatuses and the vehicle, wherein
the communication relay apparatus is configured to perform pairing between the vehicle and one of the plurality of charging apparatuses based on a signal outputted from the vehicle which detects a first electric power having predetermined power pattern, the first electric power is supplied from the one of the plurality of charging apparatuses to the vehicle via the predetermined power supplying path,
the communication relay apparatus controls at least one charging apparatus such that at least one charging apparatus supplies the first electric power to the vehicle in response to a request from the vehicle.

9. A charging control method of controlling a plurality of charging apparatuses, each of the plurality of charging apparatuses being configured to be capable of supplying electric power to a vehicle through a predetermined power supplying path, wherein
the charging control method performs pairing between the vehicle and one of the plurality of charging apparatuses based on a signal outputted from the vehicle which detects a first electric power having predetermined power pattern, the first electric power is supplied from the one of the plurality of charging apparatuses to the vehicle via the predetermined power supplying path,
the charging control method controls at least one charging apparatus such that at least one charging apparatus supplies the first electric power to the vehicle in response to a request from the vehicle.

* * * * *